(12) United States Patent
Tokuhara et al.

(10) Patent No.: US 7,307,417 B2
(45) Date of Patent: Dec. 11, 2007

(54) ROTATION DETECTING DEVICE

(75) Inventors: Minoru Tokuhara, Okazaki (JP);
Yukihiro Kato, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/819,766

(22) Filed: Jun. 29, 2007

(65) Prior Publication Data

US 2007/0247144 A1   Oct. 25, 2007

Related U.S. Application Data

(62) Division of application No. 11/263,556, filed on Nov. 1, 2005, now Pat. No. 7,253,613.

(30) Foreign Application Priority Data

Nov. 2, 2004 (JP) ............................ 2004-319566
Mar. 1, 2005 (JP) ............................ 2005-56327

(51) Int. Cl.
*G01B 7/30* (2006.01)
*G01R 33/07* (2006.01)
*G01R 33/09* (2006.01)

(52) U.S. Cl. ..................... 324/207.25; 324/207.2; 324/251; 324/207.21

(58) Field of Classification Search ................
324/207.2–207.21, 251–252, 173–174; 73/514.31, 73/514.39
See application file for complete search history.

(56) References Cited

U.S. PATENT DOCUMENTS

| 6,366,079 B1 | 4/2002 | Uenoyama |
| 6,420,865 B1 | 7/2002 | Rettenmeier |
| 6,498,479 B1 | 12/2002 | Hamaoka et al. |
| 6,812,694 B2 | 11/2004 | Uenoyama |

FOREIGN PATENT DOCUMENTS

| JP | A-62-66117 | 3/1987 |
| JP | A-64-88115 | 4/1989 |
| JP | A-2-262008 | 10/1990 |

*Primary Examiner*—Bot LeDynh
(74) *Attorney, Agent, or Firm*—Posz Law Group, PLC

(57) ABSTRACT

A rotation detecting device for detecting a rotating object includes a housing having a bearing and an mounting surface, a rotor member having magnetic peripheral portion and a rotary shaft that is supported by the bearing, a biasing permanent magnet for providing magnetic field around the mounting surface and the magnetic peripheral portion, an IC sensor chip including plural magnetic sensor elements disposed on the mounting surface to provide a sensing signal related to change in magnetic field around the sensor elements, and an IC signal processing chip that provides a rotation signal according to the sensing signal. In this device, the bearing and the mounting surface are integrally formed into the housing at a prescribed distance to secure an unchanged air gap distance.

8 Claims, 9 Drawing Sheets

THRESHOLD VOLTAGE

ROTATION DETECTING DEVICE

CROSS REFERENCE TO RELATED APPLICATION

The present application is a division of application Ser. No. 11/263,556 filed on Nov. 1, 2005, now U.S. Pat. No. 7,253,613, which is based on and claims priority from Japanese Patent Applications 2004-319566, filed Nov. 2, 2004 and 2005-56327, filed Mar. 1, 2005, the contents of which are incorporated herein by reference.

BACKGROUND OF THE INVENTION

1. Field of the Invention

The present invention relates to a rotation detecting device for detecting rotation of a vehicle engine, wheel rotation speed or the like and, particularly, a rotation detecting device that employs magnetoresistance elements or hall elements.

2. Description of the Related Art

U.S. Pat. No. 6,366,079 B1 or JP-A-2001-153683, which is a publication of its counterpart Japanese patent application, discloses a common rotation detecting device. Such a rotation detecting device provides rotation data of an engine crankshaft by detecting changes in a magnetic field caused by rotation of a rotary magnetic member that is rotated by the engine crankshaft. As shown in FIG. 6, such a rotation detecting device includes a bridge circuit 3 of four magnetoresistance sensors MRE 1, MRE 2, MRE 3, MRE 4 and a signal processing circuit, which are formed in an IC chip. The IC chip is disposed on a surface of a member formed at a distance L from the rotary magnetic member. The signal processing circuit includes a differential amplifier 4 and a comparator 5 The IC chip is covered with a coating member of resinous material, from which electric terminals including a power terminal to be applied a voltage (+V), an output terminal T2 and a ground terminal are drawn out. In that common rotation detecting device, a variation in the distance between the magnetoresistance sensors and the rotor member causes one of major errors in the rotation data.

U.S. Pat. No. 6,812,694 B2 or its counterpart Japanese patent application JP-A-2004-301645 discloses another common rotation detecting device. In this rotation detecting device, a similar problem is caused by a variation in the distance between the magnetoresistance sensors and the rotor member.

SUMMARY OF THE INVENTION

Therefore, an object of the invention is to provide an improved rotation detecting device having magnetic sensors that can be set at a more accurate distance from a rotary magnetic member.

Another object of the invention is to provide a rotation detecting device that is easy to correct detection errors.

According to a main feature of the invention, a rotation detecting device for detecting a rotating object includes a housing having a bearing and an mounting surface, a rotor member having magnetic peripheral portion and a rotary shaft that is connectable to the rotating object and is supported by the bearing, a biasing permanent magnet for providing magnetic field around the mounting surface and the magnetic peripheral portion, a semiconductor chip including plural magnetic sensor elements disposed on the mounting surface, means for providing a rotation signal according to the sensing signal provided by the semiconductor chip.

In the above, rotation detecting device, the bearing and the mounting surface are integrally formed with the housing at a prescribed distance. Further, the semiconductor chip further includes a signal processing circuit that includes a nonvolatile memory for storing adjusting data to adjust a variation of the sensing signal due to the prescribed distance.

The magnetic sensor element may include a magnetoresistance element. Preferably, the magnetic peripheral portion is a gear-teeth type member, and the mounting surface is formed perpendicular to the rotary shaft on an imaginary plane cutting the rotor member at the axially middle thereof. In this embodiment, the biasing permanent magnet may have a cylindrical shape surrounding the semiconductor chip.

In the rotation detecting device as described above, the conductor chip may further include a data-input terminal extending from the nonvolatile memory for inputting data from outside after the conductor chip is mounted on the mounting surface.

Another object of the invention is to provide a rotation detecting device that can detect an accurate rotation state even if there is a variation in the distance between the rotor member and the semiconductor chip.

According to another feature of the invention, a rotation detecting device for detecting a rotating object includes a pair of magnetic sensor units disposed to apart from each other at a prescribed pitch to provide magnetic vector detection signals, a biasing permanent magnet, a rotor member having first means for changing magnetic field around the magnetic sensor units, and second means for comparing the detection signals with a threshold level to provide a binary signal. Further, the first means includes a plurality of members on the periphery of the rotor member each of which is disposed at the same prescribed pitch from another to face the magnetic sensor units at a close distance.

This rotation detecting device may further include an offset adjusting circuit for removing an offset component included in the magnetic vector detecting signals. The offset adjusting circuit may include a coupling capacitor and voltage dividing resistors.

This rotation detecting device may include a differential amplifier connected to the pair of magnetic sensors. The first means may include a gear type magnetic rotor having a plurality of teeth on the periphery thereof or magnetic poles of a permanent magnet. The magnetic sensor unit may be a magnetoresistance element or a hall element.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A rotation detecting device according to the first embodiment of the invention will be described with reference to FIGS. 1-4 and FIGS. 5A-5F.

Figure 1:
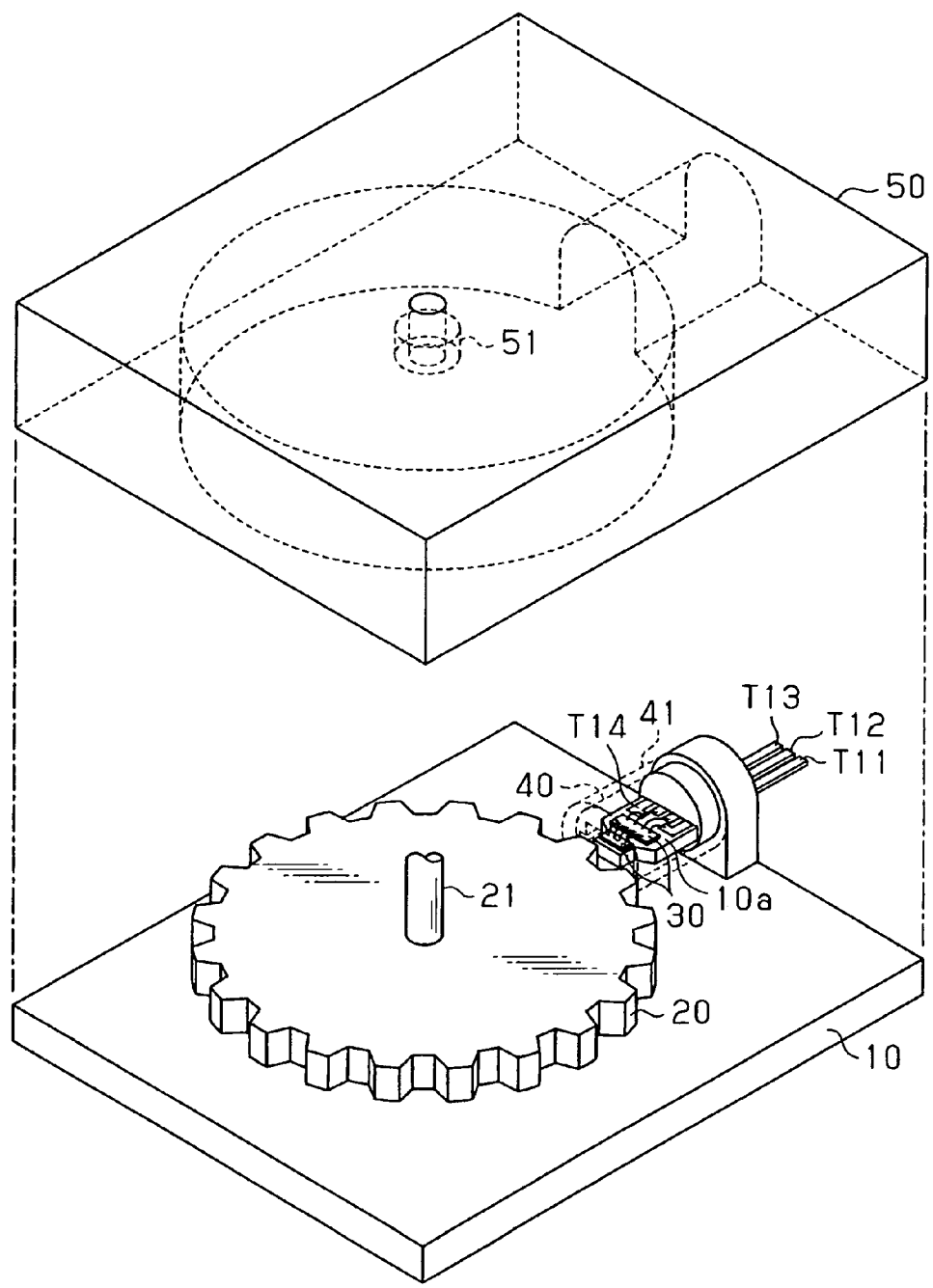
FIG. 1 is a schematic and perspective view of a rotation detecting device according to the first embodiment of the invention from which a cover is taken off.

As shown in FIG. 1, the rotation detecting device is comprised of a housing 10, a gear-teeth type magnetic rotor member 20, a magnet-sensing semiconductor chip 30, a biasing permanent magnet 40 and a cover 50.

Figure 2:
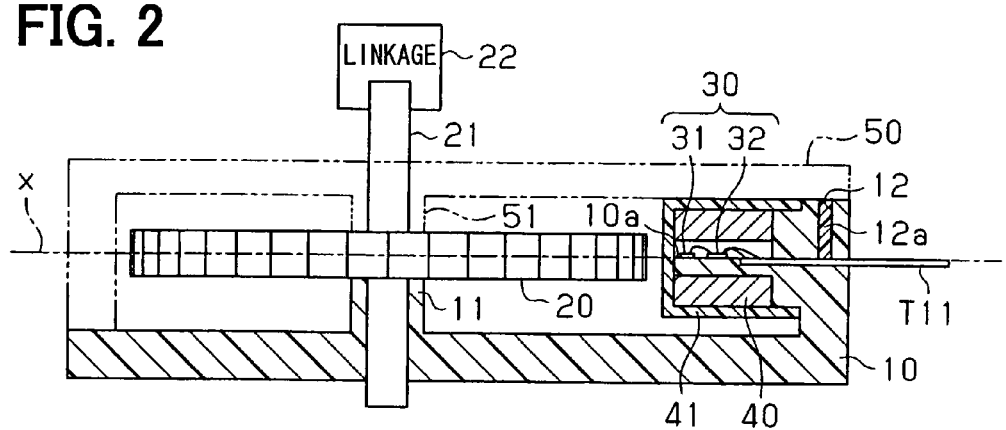
FIG. 2 is a cross-sectional side view of the rotation detecting device shown in FIG. 1.
Figure 3:
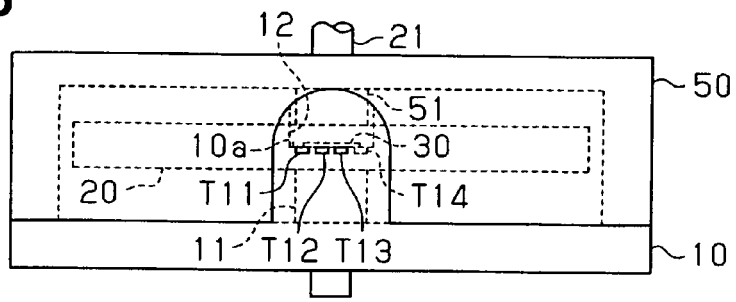
FIG. 3 is a side view of the rotation detecting device shown in FIG. 1.

As shown in FIGS. 2 and 3, the housing 10 is made of an insulative resinous member that has a bearing portion 11 for supporting one end of a rotary shaft 21 of the rotor 20 and a chip mounting surface 10a that is formed perpendicular to the rotary shaft 21 on an imaginary plane x extending through the axially middle portion of the rotor member 20. The semiconductor chip 30, which includes a magnetic sensor chip 31 and a signal processing chip 32, is directly fixed to the chip mounting surface 10a. Because the bearing portion 11 and the chip mounting surface 10a are integrally formed with the housing 10, it is easy to provide an accurate distance between the rotor member 20 and the magnetic sensor chip 31 or the magnetic sensor elements. It is also easy to adjust the wave form of the output signal of the semiconductor chip 30 even if there is an error in the distance between rotor member 20 and the semiconductor chip 30.

The rotor member 20, which is supported by the rotary shaft 21, is connected to an engine crankshaft by a linking mechanism 22 that includes gears and the like. In this case, the rotation detecting device detects rotation data of the crankshaft from the output signal of the semiconductor chip 30.

The biasing permanent magnet 40 has a cylindrical shape that surrounds the semiconductor chip 30 to form a magnetic field around it. A cylindrical cap 41 is fitted to a projecting portion of the housing to cover the semiconductor chip 30 and the biasing permanent magnet 40. The cover 50 is fitted to the housing 10 to cover all the elements of the rotation detecting device. The cover 50 has a bearing portion 51, as shown in FIG. 1, which supports the other end of the rotary shaft 21. The housing 10 and the cover 50 may have vent holes for cooling the rotation detecting device.

Figure 4:
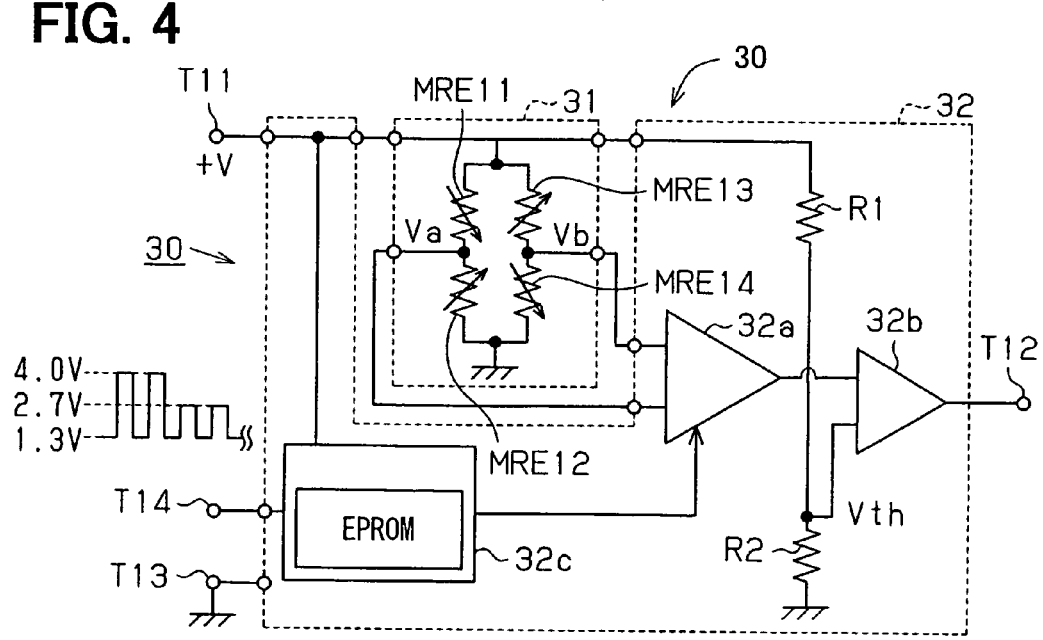
FIG. 4 is an equivalent circuit diagram of a semiconductor chip of the rotation detecting device according to the first embodiment.

As shown in FIG. 4, the sensor chip 31 includes four magnetoresistance elements, and the signal processing chip 32 provides a binary signal, as its output signal, from the output signal of the sensor chip 31. The magnetoresistance element changes its resistance when the rotor member 20 rotates, thereby changing magnetic field caused by the biasing permanent magnet. The signal processing chip 32 includes a nonvolatile memory that stores adjusting data so as to adjust or correct the wave form of the output signal. The sensor chip 31 and the signal processing chip 32 are respectively connected to an electric power source terminal T11, an output terminal T12 and a ground terminal T13. One ends of the terminals T11, T12 and T13 are insert-molded in a peripheral portion of the housing 10 and the other ends thereof extend outward, as shown in FIG. 2. The output terminal T12 is connected to an ignition timing control device, for example, to send the output signal of the signal processing chip 32.

A data-input terminal T14 is drawn out from the housing through an open groove 12, which is shown in FIG. 3 and FIGS. 5A-5F, to input the adjusting data to the nonvolatile memory. In other words, the housing has a groove 12 for exposing the terminals T11, T12, T13 and T14 to an outside. When the adjusting data are inputted, the opening portion of the groove 12 is covered with insulating material. The terminal T14 may extend outward as the terminals T11, T12, T13.

The semiconductor chip 30 includes the sensor chip 31 and the signal processing chip 32, which may be separated or integrated into one chip. The sensor chip 31 includes a bridge circuit of four magnetoresistance elements MRE 11-MRE 14. Elements MRE 11 and MRE 12 are connected in series to form a half bridge circuit, elements MRE 13 and MRE 14 are also connected in series to form another half bridge circuit. Elements MRE 11 and MRE 13 and elements MRE 12 and MRE 14 are respectively connected so that both series circuit are connected in parallel to form a full bridge circuit. The joint of elements MRE 11 and MRE 13 is connected to the terminal T11 from which constant voltage +V (e.g. 5 V) is applied to bridge circuit. The joint of the elements MRE 12 and MRE 14 is grounded via the terminal T13. The joint of the elements MRE 11 and MRE 12 and the joint of the elements MRE 13 and MRE 14 are respectively connected to a differential amplifier 32a of the signal processing chip 32 to send voltage signals Va and Vb.

The signal processing chip 32 includes the differential amplifier 32a, a comparator 32b and a memory circuit 32c that includes a nonvolatile memory. The differential amplifier 32a amplifies the difference between the voltage signals Va and Vb and sends the amplified signal to the comparator 32b, which converts the amplified signal into a binary signal or a pulse signal. The comparator 32b provides the binary signal with a threshold level Vth that is a fraction of the constant voltage +Vc provided by a voltage dividing series circuit of resistors R1 and R2. The memory circuit 32c is powered via the terminal T11 and sends the differential amplifier 32a a voltage signal (analog signal) that is based on the adjusting data stored in the nonvolatile memory via the data-input terminal T14. The memory circuit 32c functions to adjust an offset value of the amplified signal of the differential amplifier 32a and its variation due to temperature change.

When the adjusting data are stored, a serial voltage modulation signal is inputted into the nonvolatile memory via the data-input terminal T14. The voltage modulation signal includes a clock signal and adjusting data, as shown in FIG. 4. The memory circuit 32c demodulates the voltage modulation signal into the clock signal and the adjusting data to write the adjusting data into prescribed addresses of the nonvolatile memory. In more detail, a piece of the adjusting data that corresponds to each clock signal is latched in a prescribed address of the nonvolatile memory. Meanwhile, a writing voltage signal (e.g. 12.6 V) is applied to the nonvolatile memory via the data-input terminal T14. Thus, the adjusting data are stored into the nonvolatile memory. The nonvolatile memory has a function of reading out the adjusting data, so that the relation between the stored adjusting data and an adjusting magnitude or an offset of the output signal of the differential amplifier 32a can be detected.

When the rotor member 20 rotates, the processing chip 32 provides a binary signal that corresponds to a position of the engine crankshaft at the output terminal T2. The wave shape of the output signal provided at the output terminal T12 is adjusted or corrected so that an error due to the variation of the distance between the magnetoresistance elements MRE 11-MRE 14 and the rotor member 20 can be reduced or eliminated.

Figure 5A:
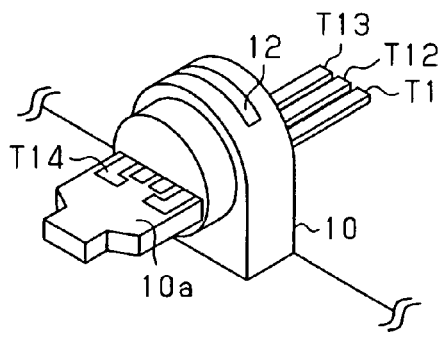
FIGS. 5A-5F illustrate steps of manufacturing the rotation detecting device according to the first embodiment.
Figure 5D:
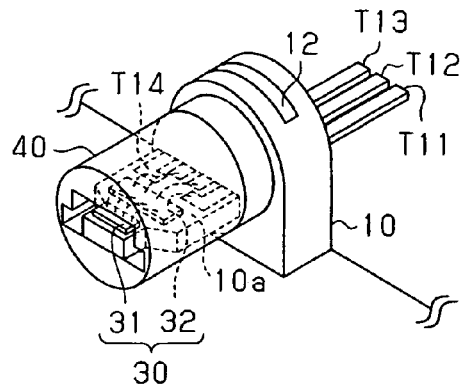
Figure 5B:
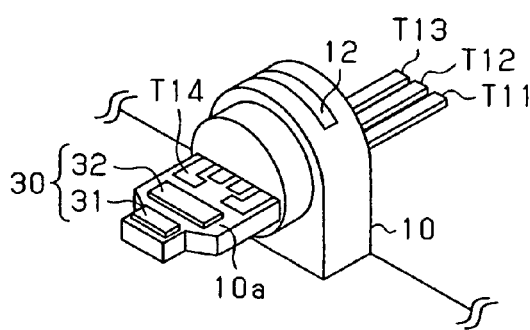
Figure 5E:
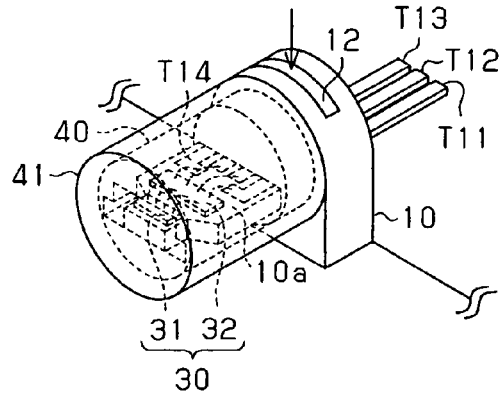
Figure 5C:
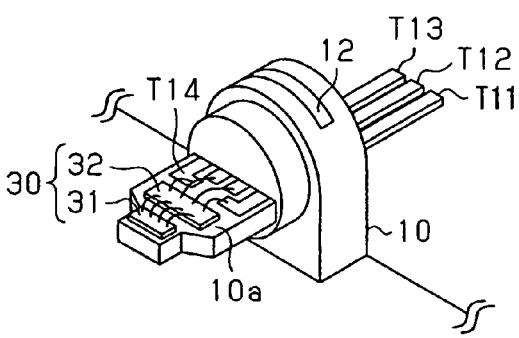
Figure 5F:
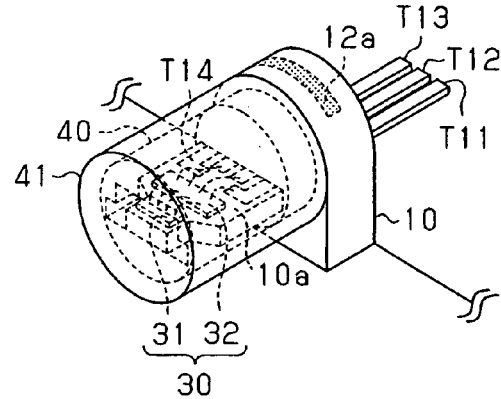
Figure 6:
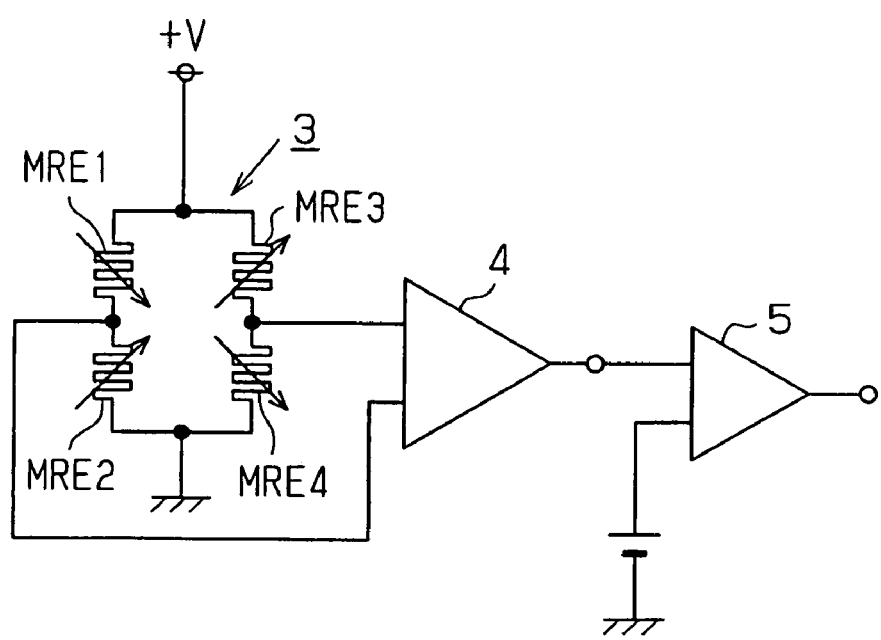
FIG. 6 is an equivalent circuit diagram of a semiconductor chip of a prior art rotation detecting device.

The rotation detecting device is assembled as shown in FIGS. 5A-5F. As shown in FIG. 5A, the mounting surface 10a, together with the bearing portion 11, the power source terminal T1, the output terminal 12, the ground terminal T13, the adjusting-data input terminal T14 and the grooves 12, is formed in the housing 10 beforehand. Then, the sensor chip 31 and the signal processing chip 32 are fixed to the mounting surface 10a via an adhesive agent such as Ag-paste, as shown in FIG. 5B. Thereafter, the power source terminal T11, the output terminal T12, the ground terminal T13 and the adjusting data-input terminal T14 are respectively connected by bonding wires to the sensor chip 31 and the signal processing chip 32, as shown in FIG. 5C. Subsequently, a protection cover or film is covered on those on the mounting surface 10a. Thus, the sensor chip 31, the signal processing chip 32 are integrally fixed to the housing 10. In the next step shown in FIG. 5D, the biasing permanent magnet 40 is fixed to the housing 10 to surround the sensor chip 31. Then, the cylindrical cap 41 is fitted and glued to a projecting portion of the housing 10 to cover the semiconductor chip 30 and the biasing permanent magnet 40, as shown in FIG. 5E. Thereafter, the rotary shaft 21 is inserted to the bearing portion 11 of the housing 10 to set the rotor member 20 to the housing 10, so that the distance between the magnetoresistance elements MRE 11-MRE 14 and the rotor member 20 can be set at a high accuracy. Thereafter, adjusting data are sent via the data-input terminal T14 to the nonvolatile member of the signal processing chip 32 and written into the nonvolatile memory. Therefore, even if the distance between the magnetoresistance elements MRE 11-MRE 14 and the rotor member 20 is not very accurate, the wave shape of the output signal provided at the output terminal T12 can be adjusted according to the adjusting data stored in the nonvolatile memory. Finally, the opening portion of the groove 12 is covered with a member 12a made of insulating material, as shown in FIG. 5F.

The groove 12 may be omitted if the adjusting data can be sent to the nonvolatile memory via the data-adjusting terminal T14 by a some other way. The biasing permanent magnet 40 can be shaped differently or disposed around the semiconductor chip differently if it can provide substantially the same magnetic field. The position of the semiconductor chip 30 can be also changed if it performs substantially the same function. The magnetoresistance elements can be replaced by other sensors that sense magnet field, such as pick-up coils, if the sensors function in substantially the same way. The housing 10 may be made of other than resinous material if the bearings and the semiconductor-chip mounting surface are integrally formed with the housing 10.

A rotation detecting device according to the second embodiment of the invention will be described with reference to FIGS. 7-11. Incidentally, the same reference numeral as the first embodiment used in the following drawings indicates the same or substantially the same part portion or composition as the first embodiment of the invention.

Figure 7:
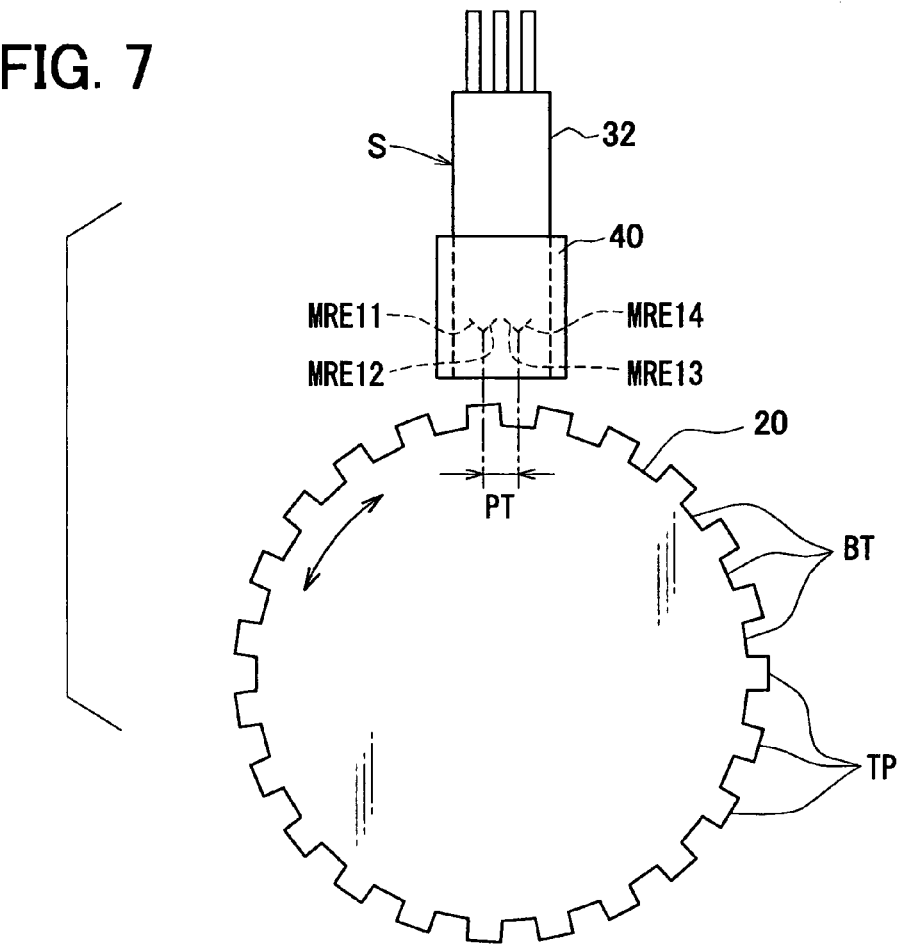
FIG. 7 is a schematic diagram of a rotation detecting device according to the second embodiment of the invention.

As shown in FIG. 7, a sensor unit S is comprised of a sensor chip 32 and a biasing permanent magnet 40. The sensor chip 32 is disposed at a position opposite a rotor member 20 so as to be surrounded by the biasing permanent magnet 40. The rotor member 20 has gear shaped teeth at its periphery.

Figure 8:
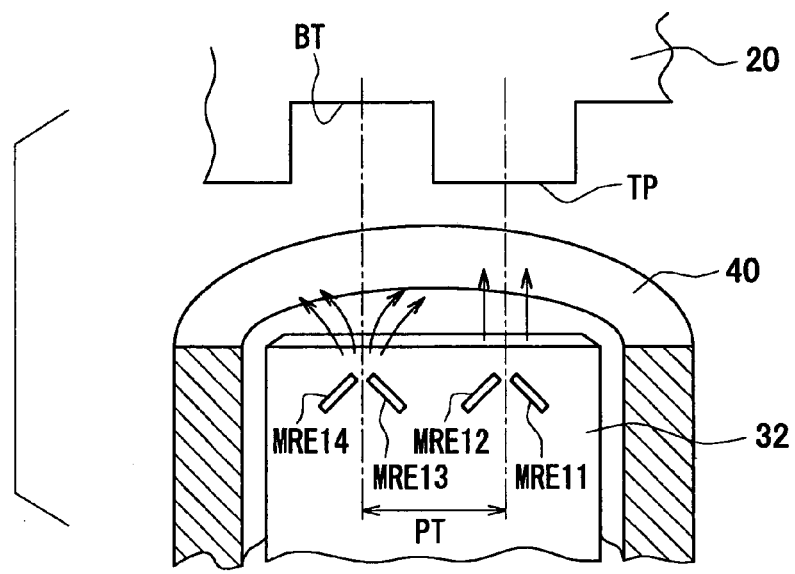
FIG. 8 is an enlarged view showing details around magnetic sensor elements and a rotor member.

As shown in FIG. 8, the sensor chip 32 includes a half bridge circuit of magnetoresistance elements MRE 11 and MRE 12 and another half bridge circuit of magnetoresistance elements MRE 13 and MRE 14. The two half-bridge circuits form a bridge circuit B. The elements MRE 11 and MRE 12 are disposed to incline to a first line that is parallel to the axis of the biasing permanent magnet 40 to form an inverted V shape, and the elements MRE 13 and MRE 14 are also disposed to incline to a second line that is parallel to the axis of the biasing permanent magnet 40 to form the same inverted V shape. The distance or pitch PT between the first line and the second line is equal to a half of the pitch between two teeth (or a pitch between the center of the teeth and the center of the bottom formed between the two teeth). It is preferable that the pitch PT (e.g. 2.5 mm) is equal to the tooth width TP as well as the bottom width BT between two teeth.

Figure 9:
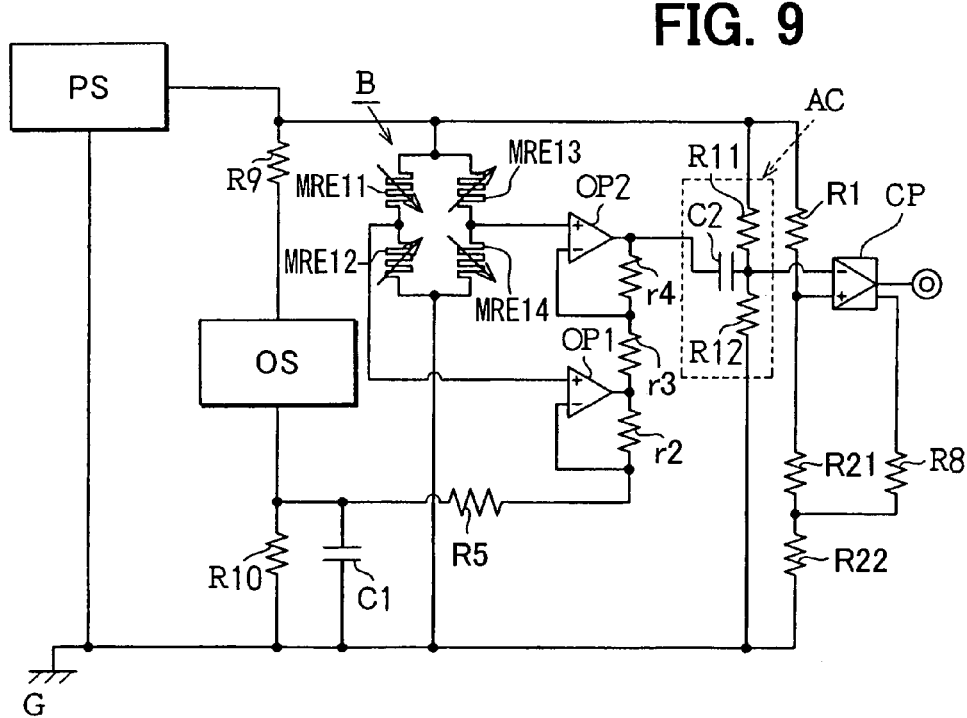
FIG. 9 is an equivalent circuit diagram of a semiconductor chip of the rotation detecting device according to the second embodiment of the invention.

As shown in FIG. 9, the bridge circuit B is connected to a constant voltage source PS at the joint of elements MRE 11 and MRE 13. The joint of the elements MRE 12 and MRE 14 is grounded. The joint of the elements MRE 11 and MRE 12 and the joint of the elements MRE 13 and MRE 14 are respectively connected to an operational amplifier OP1 and an operational amplifier OP2. The operational amplifiers OP1, OP2 have respective gains that are set by resistors r2, r3 and r4. The output voltage wave of the operational amplifier OP2 is sent to the inverted input terminal of a comparator 32b via a coupling circuit AC. The coupling circuit AC includes a coupling capacitor C2 and a series circuit of resistors R11, R12. Accordingly, an offset voltage or a dc component of the output voltage of the operational amplifier OP2 is removed by the coupling capacitor C2, and an offset voltage or a dc component is provided by the series circuit of the resistors R11, R12. This output voltage wave is compared with a threshold voltage provided at the non-inverted terminal of the comparator CP by a series circuit of resistors R1, R21 and R22, so that a binary signal for detecting rotation of the rotor member 20 is provided. In this embodiment, the divided voltage provided by the resistor R11, R12 is set to correspond to the divided voltage provided by the resistances of the resistors R1, R21, R22, so that an offset component that corresponds to the threshold voltage is added to the input voltage wave of the comparator CP. A resistor R8 is connected between the joint of the resistors R21 and R22 and the comparator CP so as to prevent unexpected flipping of the comparator CP. An offset circuit OS is connected between resistors R9 and R10 to form a series circuit that is in parallel with the constant voltage source PS. The offset circuit OS controls the offset voltage.

A capacitor C1 is connected in parallel with the resistor R10 to remove noises, thereby keeping accuracy of rotation detection.

Figure 10A:
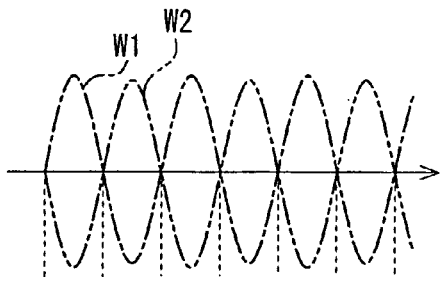
FIGS. 10A, 10B and 10C forms a time chart showing signal waves in the equivalent circuit shown in FIG. 9.
Figure 10B:
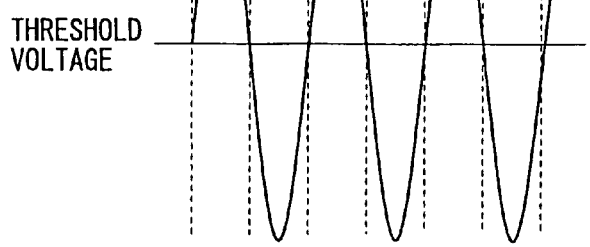
Figure 10C:

When the rotor member rotates, the bridge circuit B provides its output signals W1, W2, as shown in FIG. 10A. The wave shape of the output signal of the operational amplifier OP2 is symmetrical with respect to the threshold voltage, as shown in FIG. 10B. As shown in FIG. 10C, the output signal (sensor output signal) of the comparator CP is set to a suitable level that provides a minimum point of air-gap characteristic, which is a point (or range) that is approximately common to all the waves.

Figure 11A:
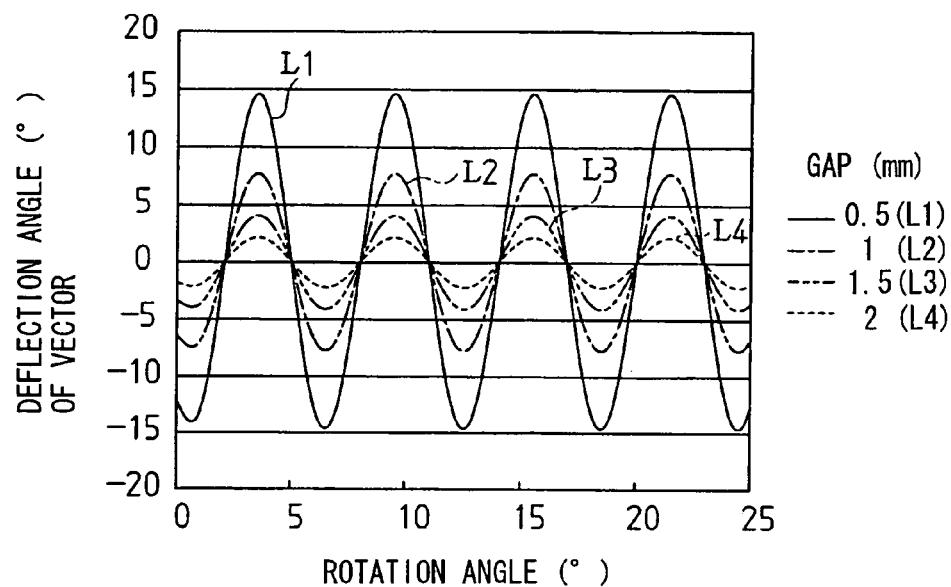
FIGS. 11A and 11B are graphs respectively showing relationship between rotation angles of the rotor member and deflection angles of a magnetic vector.
Figure 11B:
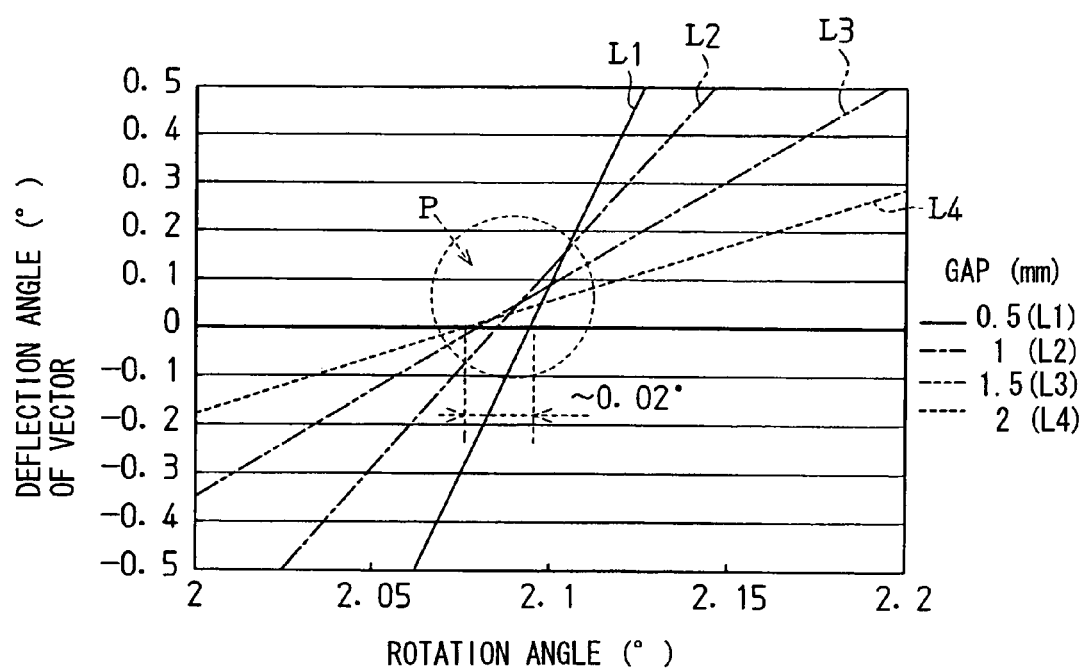

According to a test result, the output signal of the operational amplifier OP2 has a different wave shape when the air gap between the sensor chip 32 and the rotor member 20 changes. In more detail, the wave shape L1 appears when the air gap between the sensor chip 32 and the rotor member 20 is 0.5 mm, the wave shape L2 appears when the air gap is 1.0 mm, L3 appears when the air gap is 1.5 mm, and the wave shape L4 appears when the air gap is 2.0 mm. The wave shapes are generally symmetrical with respect to the threshold voltage, as shown in FIG. 11A. In other words, the threshold voltage can be set to have points within the minimum point P of air-gap characteristic that has a range of about 0.02 degree, as shown in FIG. 11B.

Figure 12:
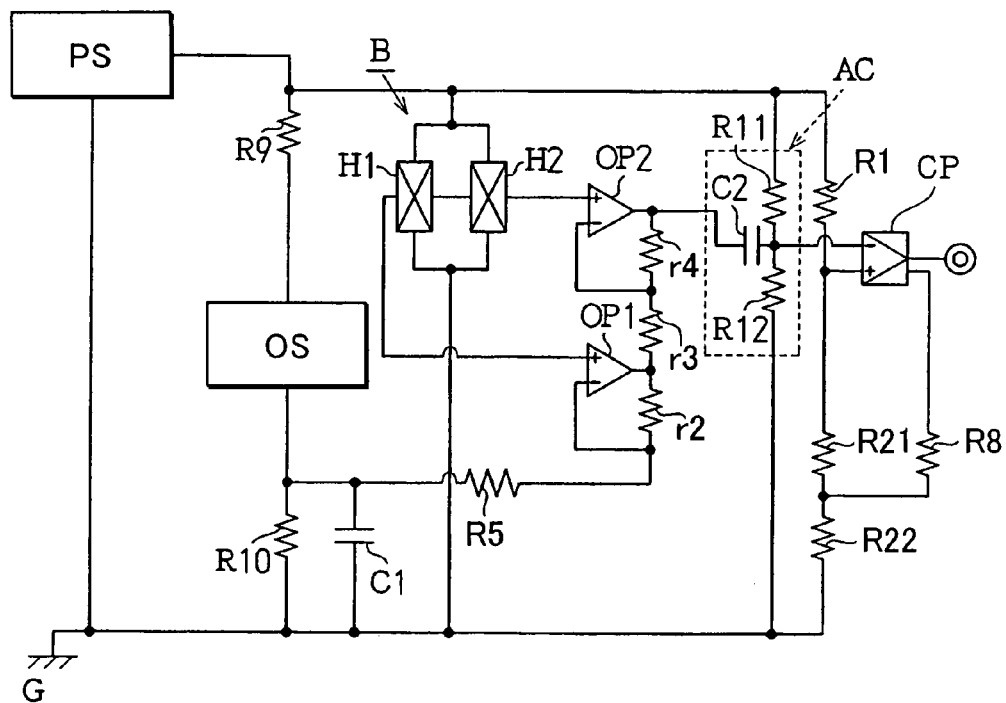
FIG. 12 is an equivalent circuit diagram of a semiconductor chip of the rotation detecting device according to the third embodiment of the invention.

A rotation detecting device according to the third embodiment of the invention will be described with reference to FIG. 12. The rotation detecting device according to the third embodiment uses hall elements H1, H2 instead of the magnetoresistance elements used in the above embodiments, as shown in FIG. 12. In this embodiment, the hall elements H1, H2 provides variable voltage signals in response to the change in magnetic vector of the magnetic field, and the variable voltage signals are amplified. The hall elements H1, H2 are respectively disposed at positions of the sensor chip 32 at a distance or pitch that corresponds to the pitch between the center of one of the teeth and the center of one of the tooth-bottoms of the rotor member 40, or a half of the pitch between two teeth.

Some variations of the above described rotor rotation detecting device will be described below.

Figure 13:
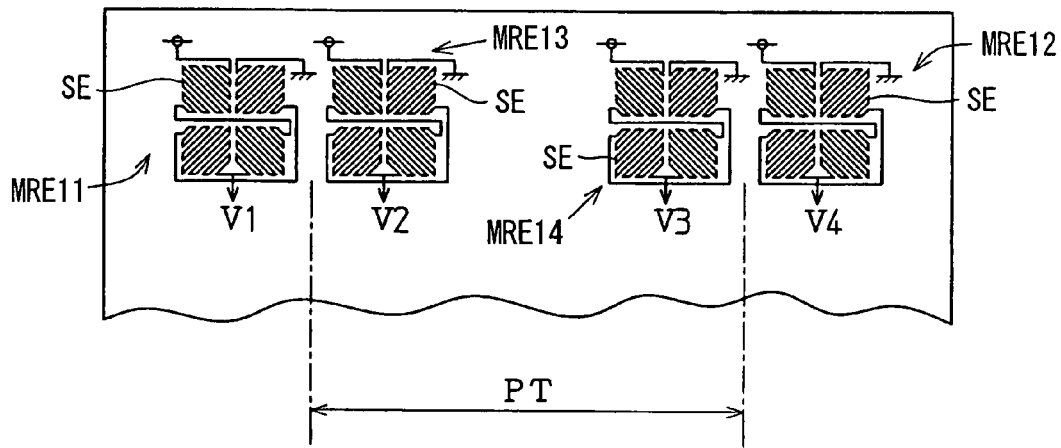
FIG. 13 is a schematic diagram of a variation of the magnetic sensor elements of the rotation detecting device according to the invention.
Figure 14:
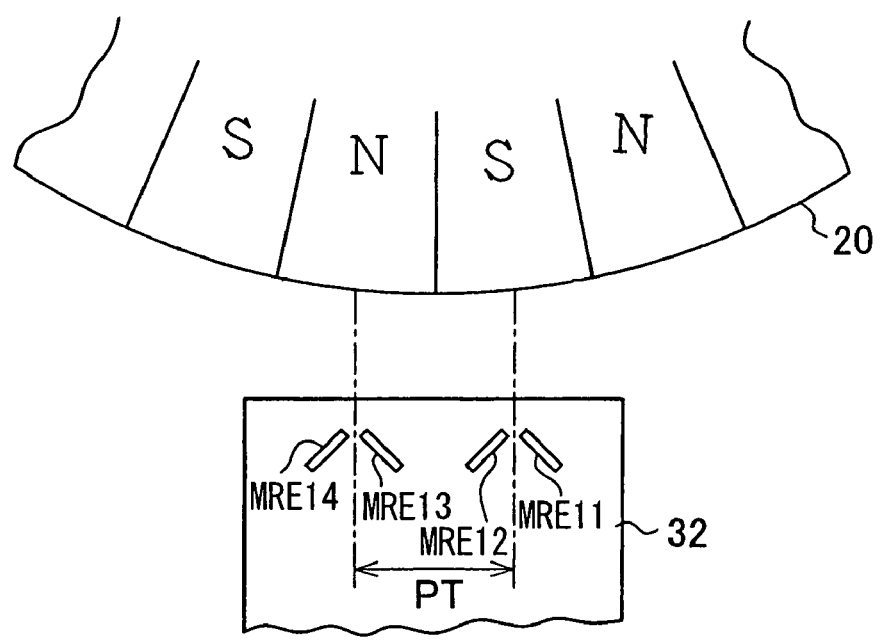
FIG. 14 is a schematic diagram showing a variation of a rotor member and the magnetic sensor elements of the rotation detecting device according to the invention.

Each of the magnetoresistance elements MRE 1-MRE 4 may be constructed of series connected four magnetoresistance sub-elements SE, as shown in FIG. 13. The magneto resistance elements MRE 1-MRE 4 are disposed so that center line between the MRE 11 and MRE 13 and the center line between the MRE 12 and MRE 14 have a distance that is equal to a half of the pitch between two teeth of the rotor 20. In this case, sensor voltage signals V1, V2, V3 and V4 are sent to differential amplifiers to have two signals, which is also sent to another differential amplifier, as disclosed in U.S. Pat. No. 6,812,694 B2.

The rotor 20 may be provided with a plurality of magnetic poles formed at equal intervals on the periphery instead of the teeth, as shown in FIG. 15. In this case, the biasing permanent magnet described in the previous embodiments is omitted.

The coupling circuit AC described in the previously described embodiments may be omitted if the wave shape of the output signal voltage can be made symmetrical with respect to the threshold voltage level by some suitable data processing means.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation detecting device for detecting a rotating object comprising:
   a pair of magnetic sensor units disposed to apart from each other at a first pitch to provide magnetic vector detection signals;
   a biasing permanent magnet;
   a rotor member having first means for changing magnetic field around said pair of magnetic sensor units, said means having a plurality of members on the periphery of said rotor member each of which is disposed at second pitch from another to face said magnetic sensor units at a close distance; and
   second means for comparing the detection signals with a threshold level to provide a binary signal, wherein the first pitch is equal to the second pitch.

2. The rotation detecting device for detecting a rotation object as in claim 1, further comprising an offset adjusting circuit for removing an offset component included in the magnetic vector detecting signals.

3. The rotation detecting device as in claim 2, wherein said offset adjusting circuit comprises a coupling capacitor and voltage dividing resistors.

4. The rotation detecting device as claimed in claim 1, further comprising a differential amplifier connected to said pair of magnetic sensor units.

5. The rotation detecting device as claimed in claim 1, wherein the first means comprises a gear type magnetic rotor having a plurality of teeth on the periphery thereof.

6. The rotation detecting device as claimed in claim 1, wherein the first means comprises a magnetic member having a plurality of magnetic poles of a permanent magnet.

7. The rotation detecting device as claimed in claim 1, wherein said magnetic sensor unit comprises a magnetoresistance element.

8. The rotation detecting device as claimed in claim 1, wherein said magnetic sensor unit comprises a hall element.

* * * * *